US012230910B2

(12) United States Patent
Hommedal et al.

(10) Patent No.: US 12,230,910 B2
(45) Date of Patent: Feb. 18, 2025

(54) SINGLE PHASE COUPLER

(71) Applicant: Siemens Energy AS, Oslo (NO)

(72) Inventors: Steinar Hommedal, Sandvika (NO); Håvard Hamstad, Trondheim (NO); Christopher Plant, Lancaster (GB)

(73) Assignee: Siemens Energy AS, Oslo (NO)

( * ) Notice: Subject to any disclaimer, the term of this patent is extended or adjusted under 35 U.S.C. 154(b) by 182 days.

(21) Appl. No.: 17/780,605

(22) PCT Filed: Dec. 2, 2020

(86) PCT No.: PCT/EP2020/084232
§ 371 (c)(1),
(2) Date: Jun. 10, 2022

(87) PCT Pub. No.: WO2021/110727
PCT Pub. Date: Jun. 10, 2021

(65) Prior Publication Data
US 2023/0352872 A1 Nov. 2, 2023

(30) Foreign Application Priority Data
Dec. 2, 2019 (GB) ...................................... 1917590
May 26, 2020 (GB) ...................................... 2007824

(51) Int. Cl.
*H01R 13/516* (2006.01)
*H01R 13/523* (2006.01)
(Continued)

(52) U.S. Cl.
CPC ......... *H01R 13/516* (2013.01); *H01R 13/523* (2013.01); *H01R 13/631* (2013.01); *H01R 43/26* (2013.01)

(58) Field of Classification Search
CPC .. H01R 13/516; H01R 13/523; H01R 13/631; H01R 43/26; H01R 2101/00; H01R 31/06
(Continued)

(56) References Cited

U.S. PATENT DOCUMENTS 4,880,390 A * 11/1989 Brackmann, Jr. .... H01R 13/523 439/204
5,363,789 A * 11/1994 Laurie .................. B63B 21/508 441/4
(Continued)

FOREIGN PATENT DOCUMENTS

CN 109390773 A 2/2019
CN 208461054 U 2/2019
GB 2520523 A 5/2015

OTHER PUBLICATIONS

International search report and written opinion dated Mar. 1, 2021 for corresponding PCT/EP2020/084232.

*Primary Examiner* — Alexander Gilman
(74) *Attorney, Agent, or Firm* — Wolter Van Dyke Davis, PLLC

(57) ABSTRACT

A subsea single phase coupler for a subsea connector includes a housing having an inboard end and an outboard end. The inboard end of the housing includes a rigid mount to receive a first wet mate connector part. The outboard end of the housing includes a cradle to receive a second wet mate connector part. The housing further includes a first locating element in the cradle to receive a second locating element on the second wet mate connector part to locate the second connector part in the housing after connection of the first and second wet mate connector parts. The coupler housing includes a section of standard profile beam.

24 Claims, 8 Drawing Sheets

(51) Int. Cl.
*H01R 13/631* (2006.01)
*H01R 43/26* (2006.01)

(58) Field of Classification Search
USPC .......................................................... 439/527
See application file for complete search history.

(56) References Cited

U.S. PATENT DOCUMENTS 5,512,833 A * 4/1996 Fukuda .................. H01R 43/22 439/489
5,614,820 A * 3/1997 Aoyama ................ G01R 31/69 324/754.14
5,689,191 A * 11/1997 Kashiyama ............ G01R 31/69 439/489
5,701,079 A * 12/1997 Yagi ....................... G01R 31/69 439/912
5,712,569 A * 1/1998 Canu ...................... G01R 31/66 439/489
5,718,603 A * 2/1998 Watanabe .............. H01R 43/22 439/489
5,777,480 A * 7/1998 Hatagishi ............... G01R 31/66 439/310
6,116,935 A * 9/2000 Fukuda .................. H01R 43/26 439/310
7,128,618 B1 * 10/2006 Roberts .................. G01R 31/69 439/700
7,530,744 B2 * 5/2009 Prel ...................... G02B 6/3816 385/53
7,618,198 B2 * 11/2009 Baxter ................. G02B 6/3816 385/53
7,628,637 B2 * 12/2009 Kramer ................ H01R 13/639 439/353
9,206,933 B2 * 12/2015 Reich ...................... F16L 39/00
9,559,463 B2 * 1/2017 Sales Casals ........ H01R 13/523
9,624,955 B2 * 4/2017 Lewkoski ........... E21B 33/0385
10,240,703 B2 * 3/2019 Langenfeld ........... E02F 3/3654
2005/0042903 A1 * 2/2005 Nicholson ............. E21B 17/028 439/201
2006/0079107 A1 * 4/2006 Allensworth ...... H01R 13/6277 439/271
2015/0378125 A1 * 12/2015 Sales Casals .......... H01R 43/26 439/271
2016/0036160 A1 * 2/2016 Sales Casals ............ H02G 1/10 439/588
2016/0245867 A1 * 8/2016 Diesen .................... B63C 11/52

* cited by examiner

SINGLE PHASE COUPLER

CROSS REFERENCE TO RELATED APPLICATIONS

This application is the US National Stage of International Application No. PCT/EP2020/084232 filed 2 Dec. 2020, and claims the benefit thereof. The International Application claims the benefit of United Kingdom Application No. GB 2007824.2 filed 26 May 2020 and United Kingdom Application No. GB 1917590.0 filed 2 Dec. 2019. All of the applications are incorporated by reference herein in their entirety.

FIELD OF INVENTION

This invention relates to a single phase coupler for a subsea, or underwater, power connector and an associated method of coupling.

BACKGROUND OF INVENTION

Subsea power grids comprise multiple elements all interconnected, typically by wet-mate connectors. These elements may include one or more subsea transformers, subsea switchgear, subsea variable speed drives and a low voltage distribution and communication system, all interconnected by connectors. The transformer/s receive three phase AC at a relatively high voltage from a power source and transform that down to a more suitable voltage for supplying subsea equipment. Conventionally, subsea transformers use three phase coupling heads. Such coupling heads are large, heavy and complicated to integrate into existing designs and difficult to manipulate and an improvement is desired.

SUMMARY OF INVENTION

In accordance with a first aspect of the present invention, a subsea single phase coupler for a subsea connector comprises a housing having an inboard end and an outboard end; wherein the inboard end of the housing comprises a rigid mount to receive a first wet mate connector part; and wherein the outboard end of the housing comprises a cradle to receive a second wet mate connector part; wherein the housing further comprises a first locating element in the cradle to receive a second locating element on the second connector part to locate the second connector part in the housing after connection of the first and second wet mate connector parts; and, wherein the coupler housing comprises a section of standard profile beam.

A standard profile beam, typically having a simple profile, such as a square or rectangular cross section along its length may be easily cut or machined to the desired shape to form the cradle of the housing and provides stability for the coupling when on the seabed, by virtue of its flag surface, as well as meeting tolerances for the connection to be effective. This improves ease of horizontal alignment during connection, compared with a typical circular cable and connector profile, and required tolerances to achieve required alignment of connectors can be achieved with less critical machining.

The standard profile beam may comprise at least one rectilinear side or surface.

The standard profile beam may comprise no more than four sides, in particular, the profile cross section is one of a triangular, rectangular or square cross section.

These shapes are relatively inexpensive to manufacture and it will be simpler to design and machine surfaces critical for alignment and mating of the connectors. S is provided se designs The first wet mate connector part may be fixedly mounted in the rigid mounting.

The second wet mate connector part may be removably mounted in the cradle.

The inboard end and the outboard end of the housing may comprise separable parts.

Each of the separable parts may comprise guide members adapted to cooperate to align the first wet mate connector part and the second wet mate connector part when the guide members are in place.

The cradle of the coupler housing may comprise an open frame.

The second wet mate connector part may comprise a connector body; a sleeve mounted radially outwardly of and in contact with at least part of the length of the connector body; and, a movable fixing on the connector body to locate the sleeve on the connector body.

The sleeve may comprise a plastic, thermoplastic or metal sleeve.

The sleeve may comprise an integral preload spring element.

The first locating element may comprise a slot in the housing and the second locating element may comprise a tab on a section in the sleeve of the second connector part.

The rear edge of the slot may comprise a non-square inwardly facing slope.

The cradle may further comprise a locking mechanism to lock the second locating element in place after connection of the first and second connector parts.

The tab may be integral with a rotatable section and provide a lifting point for an ROV lifting tool.

The sleeve may comprise a recess to receive a rotatable section with an integral tab, for example a cylindrical section around the sleeve. The cylindrical section may rotate freely, but by locating that section in a recess in the sleeve, the section does not slip off the sleeve.

An ROV stroking tool comprises a frame and a slidable carriage mounted to the frame.

The couplers may be mounted to a subsea module at an angle in a range of zero degrees relative to a horizontal axis of the module to 45 degrees to the horizontal axis of the module.

The module may be a power grid component or connected consumer, such as one of a transformer, a variable speed drive, a pump, a compressor, or a separator.

The second connector part may connect a jumper, umbilical or subsea cable, or provides a protective cap for the first connector part.

One of the first and second connector parts may comprise a plug connector and the other may comprise a receptacle connector.

In accordance with a second aspect of the present invention, a method of coupling a subsea connector part of a connector to a subsea module, the connector comprising a first wet mate connector part and a second wet mate connector part; and the subsea module comprising a subsea single phase coupler according to the first aspect, comprises placing the second connector part into the cradle of the coupler using a stroking tool and/or manipulator arm/grip of a remotely operated vehicle; activating the sliding carriage of the stroking tool and/or manipulator arm/grip to move the second connector part towards the first connector part in the coupler and join the first and second connector parts.

The method may comprise engaging a first locating element with a second locating element before removing the stroking tool and/or manipulator arm/grip.

The engaging may comprise rotating a tab on a sleeve of the second connector part into a locator slot of the cradle; and removing the stroking tool.

The integral preload spring element of the sleeve of the second connector part may absorb force applied by the stroking tool as electrical contact is made between the first and second connector parts.

The module may be a power grid component or connected consumers, such as one of a subsea transformer, a subsea compressor, a subsea variable speed drive, or a subsea separator.

The sliding carriage may be activated by a force from the ROV, for example the activation of the sliding carriage of the ROV tool may be by applying hydraulic pressure to the tool through a hydraulic fluid port.

BRIEF DESCRIPTION OF THE DRAWINGS

An example of a subsea single phase coupler and associated method of coupling in accordance with the present invention will now be described with reference to the accompanying drawings in which.

DETAILED DESCRIPTION OF INVENTION

Figure 1:
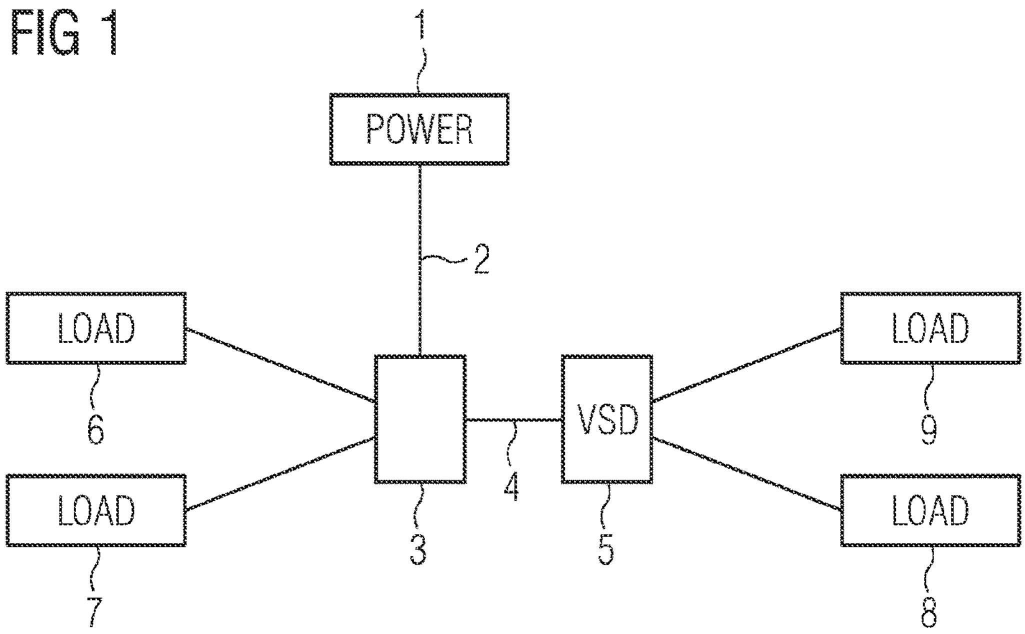
FIG. 1 is a block diagram of a typical subsea grid in which couplers according to the invention may be used.

Electrical medium or high voltage connections between subsea modules of a subsea power grid are often three phase, with each phase having a cable of some weight and stiffness, as well as couplers that require careful mating. In a subsea power grid, the power grid may comprise a plurality of subsea modules, such as variable speed drives (VSD) installed at a location on the seabed and switchgear to distribute power to each drive from a transformer. Alternatively, the transformer may be aggregating power from local sources and preparing to send that power to the shore, or supplying that locally generated power to subsea modules. In the first case, the transformer is provided to transform power from a power source down to an operating voltage and supply power via the switchgear to the drives. Electric power may be transmitted to the subsea installation from a topside installation, e.g. via an umbilical from an oil platform or ship, or via a subsea cable from an onshore site, or there may be incidental local power generated subsea, suitable for low power applications. Higher voltages are often used for transmission of electric energy from a topside installation to the subsea installation, as this helps to limit losses. However, for some power generation offshore, e.g. from wind turbines, the voltage may need to be stepped up, so a suitable transformer is provided according to the power source.

The transformer is a substantial piece of equipment, of the order of several meters across, wide and long, for example 4 m×4 m×8 m. A subsea power cable from a power source, or generator of some type, such as a topside wind turbine, supplies power into the transformer. The power cable may provide several megawatts of power, typically of the order of 30 to 40 MW of power, at a relatively high voltage, typically of the order of 100 s of kV, for example, 130 kV. Typically, the power at that voltage is transformed down to enable 6 MW of power to be supplied to each VSD. Conventionally, the cable is three phase cable and there are three electrical couplers in a single connection head on the switchgear.

However, above certain power levels, subsea mated MV and HV three phase power coupling heads are outside the weight handling capability of a traditional ROV, so cranes are used to provide simultaneous mating and connection in a single three part coupling head of the three electrical power phases. This coupling head comprises a mechanical assembly terminating three braided, clamped or strapped single cables. Operation of such coupling heads involves subsea lifting by crane-wire from the surface, with an ROV providing guiding, but the weight and rigidity of the head with attached cables means that crane operation is required. An alternative is to place the coupling head assembly on the tip of a subsea winch-operated pivoting boom or in a vertical or horizontal slide-arrangement, but this requires narrow positional tolerances between modules.

For subsea wet mate high voltage power connections, as mentioned above, the size and weight of the three phase coupling head is substantial, the weight running to several tonnes and this means that connections can only be made using a crane on a vessel supporting the coupling head, with an ROV deployed to help guide the coupling head into place. Not only does this add to the costs of installation, as the vessel or vessels used may need to remain on station for longer, but also the costs for any repair or maintenance action that requires the power cables to be disconnected, as a vessel with a crane must be chartered for that specific job. Each connector may weigh about 150 Kg, the cables typically weigh about 20 Kg per metre and each main head of the three phase coupler may weigh about 3 tonnes, which can only be handled by a crane from a vessel for mating and demating. Even with a crane, the three phase coupler head is difficult to mate, a module must be accurately positioned relative to the connecting module and is hard to manoeuvre due to the need to twist the cables of each phase together to prevent problems with electromagnetic compatibility due to their proximity. In total, the weight of the coupler, cable and connectors that have to be maneuvered into place may be as much as 6 tonnes. Operators would prefer to be able to use ROVs for this purpose, but ROVs cannot handle that sort of weight and bulk without the crane to bring the heavy outboard coupler assemblies into position and to lift and connect the outboard coupler with the inboard couplers.

The present invention addresses this problem by separating out each of the three phase cables into single phase connections. Although at first site, this might seem like a backwards step, introducing additional components and increasing the number of individual operations, there are benefits for the operator in this change of design. Instead of a three phase coupler head and associated cabling being in one unit, the invention uses three separate single phase couplers and three separate cables for each three phase connection. The reduction in size and weight of each individual coupler, as compared with the conventional three phase coupler, allows the connection to be made by an ROV, rather than having to use a crane on a vessel.

Another feature of the design is that the connection mounting arrangement is small enough and flexible enough to enable an ROV to handle the single phase coupler head and cable and make the connection. Partly this is achieved because splitting down to connect only one phase at a time relaxes the tolerances needed between the phases. After putting the outboard coupler down by the inboard coupler, a removable tool is used by the ROV to mate the single phase outboard coupler head with the inboard coupler. Separating out the phases into individual connections means that the electrical wires of the three independent phases can be managed to avoid circulating earth current, or electromagnetic effects. The coupling design may be standardised for each phase and use a support or cradle based on a simple profile, such as a standard box section metal beam.

FIG. 1 is a block diagram of a typical subsea power grid. Power from a power source 1 is fed via an umbilical 2 to a transformer 3. The transformer is connected via jumpers 4 to one or more variable speed drives 5, or loads 6, 7. The variable speed drives may also connect to loads 8, 9. The transformer 3 may be a step down transformer if it brings power from a higher voltage than is required for operation of the VSDs 5 or loads 6 to 9, or it may be a step up transformer if it aggregates locally generated power. In some subsea grids, both step up and step down transformers may be provided. The loads 6,7 connected to the transformer 3 and the loads 8, 9 connected to the variable speed drive may, for example be pumps or compressors driven by electric motors, or may be separators. Suitable wet mate connectors are provided to connect cables, umbilicals, or jumpers to each element of the grid. Alternatively, some of the components may be connected by dry mates before installation subsea, for example, the cables may have a dry mate connector at the transformer or VSD end and a wet mate connector to the loads. The second connector part may take the form of a protective cap that is put in place topside and removed and replaced with the functional second connector part subsea.

Figure 2A:
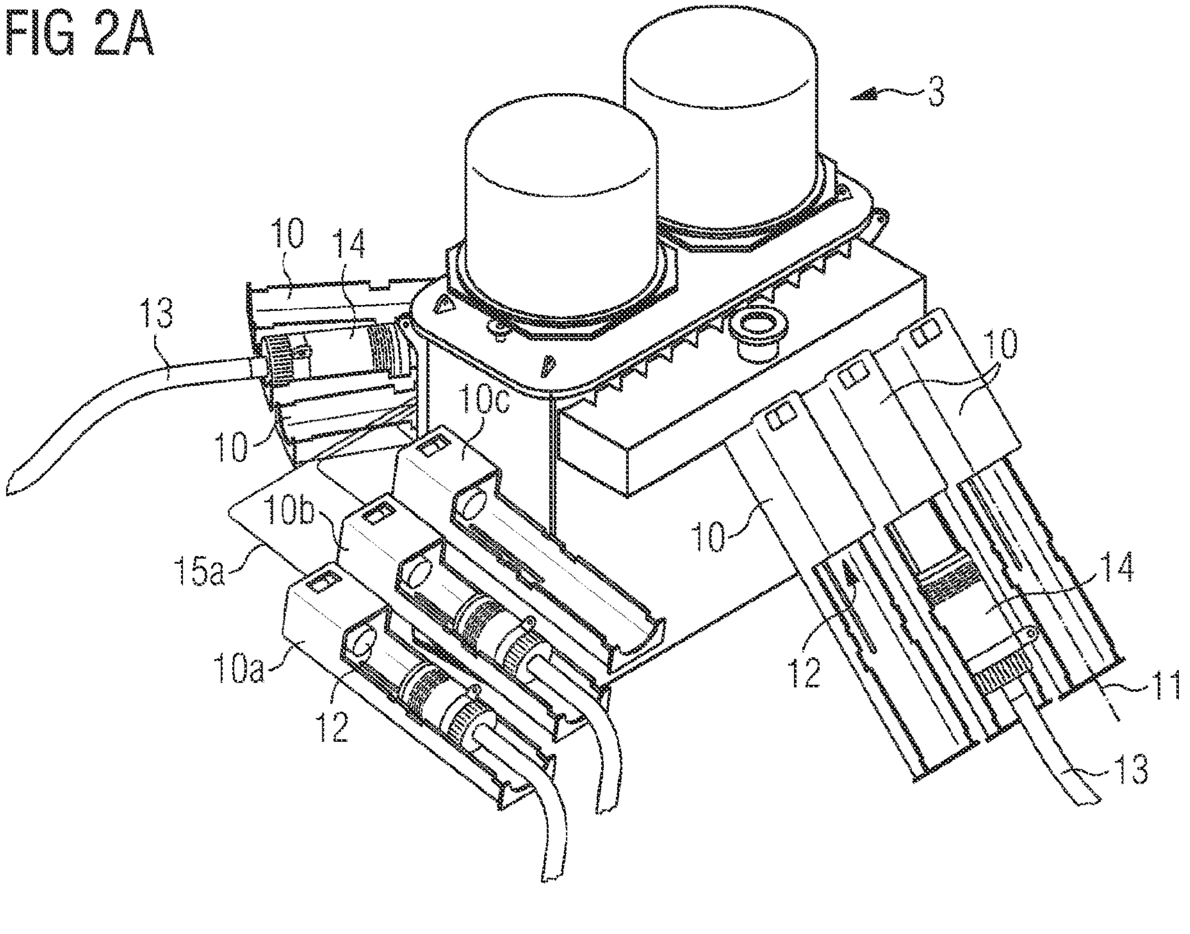
FIG. 2*a* is a perspective view of an example of a subsea transformer and a number of options for single phase couplers according to the present invention.
Figure 2B:
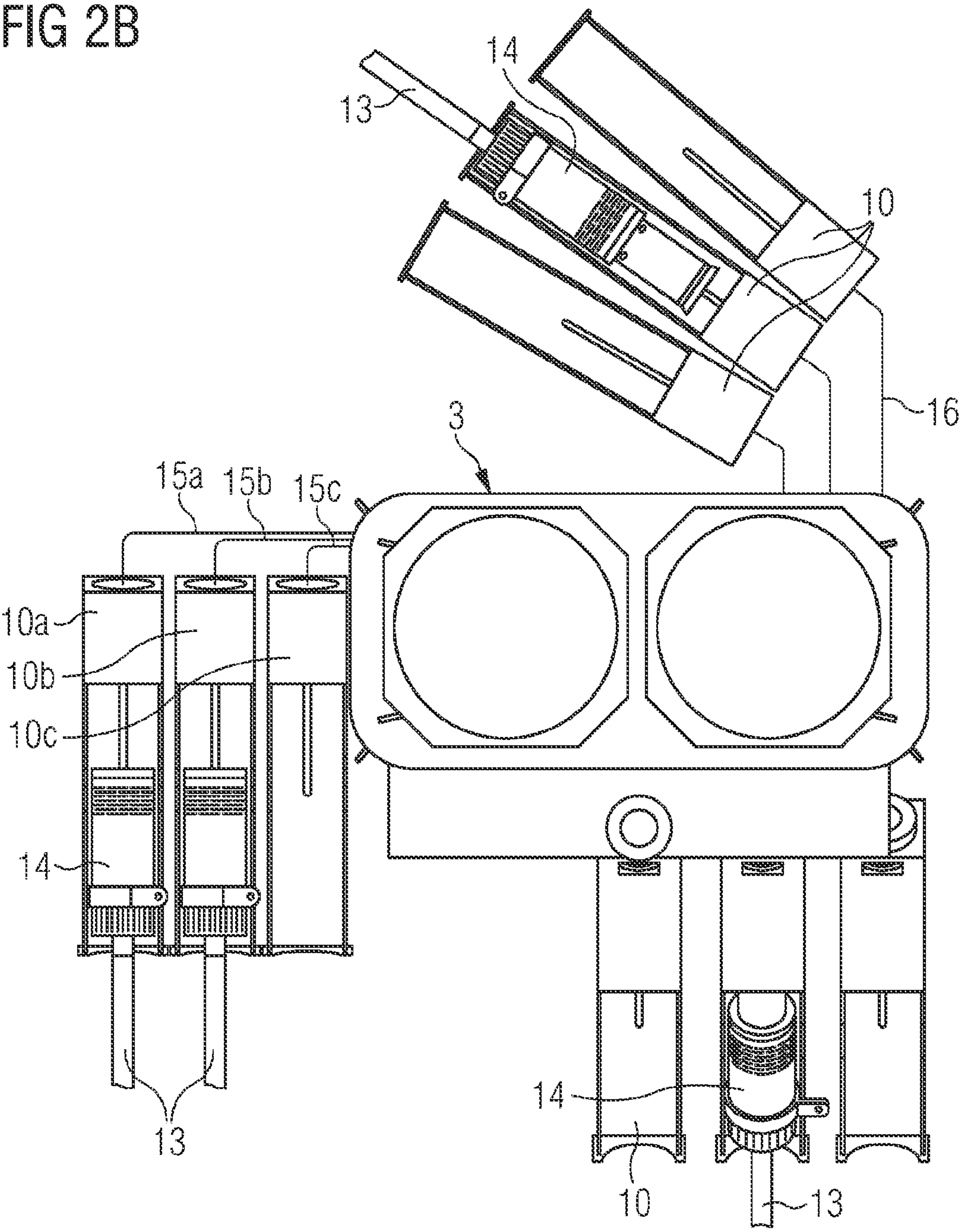
FIG. 2*b* is a view from above of FIG. 1*a;*

FIGS. 2*a* and 2*b* illustrate an example of a subsea transformer and various arrangements of single phase couplers in accordance with the present invention. The specific arrangement of the groups of three single phase couplers may be modified according to the requirement, but the figure illustrates some non-limiting examples. FIG. 2*a* is a perspective view. As previously explained with respect to FIG. 1, the transformer 3 may be connected to a plurality of subsea modules or electrical loads 6 to 9, such as pumps, separators, or compressors, indirectly via VSDs 5, via a switchgear to a module 8, 9, which may be integrated into the transformer 3, or directly to a subsea module 6,7. Typically, direct drive is from a dedicated transformer for a single load, such as a transformer for a compressor, or a transformer for a pump. For multiple loads, switchgear is used. The switchgear also serves as a fuse for each electrical consumer circuit, being able to switch the power off to a consumer, if a fault occurs. A single phase coupler comprises a housing 10 having an inboard end 30 (FIG. 4) and an outboard end 33. The inboard end 30 of the housing comprises a rigid mount 22 to receive a first wet mate connector part 12 and the outboard end 33 of the housing comprises a cradle 21 to receive a second wet mate connector part 14. As described in more detail below, the cradle is formed in a standard beam section, with an open section formed from the standard beam section outboard to receive the second wet mate connector part 14 and the standard beam section being kept complete at the inboard end to receive the first wet mate connector part 12. The inboard end with its complete beam section provides rigidity. The outboard end with part of that section cut or machined away still has at least one flat surface for stability and has been shaped accordingly to allow the second wet mat connector part to be inserted. The housing further comprises a first locating element 25 in the cradle 21 to receive a second locating element 24 on the second connector part 14 to locate the second connector part 14 in the housing 10 after connection of the first and second wet mate connector parts 12, 14. The couplers may be arranged in different ways on a subsea module. The inboard and outboard parts 30, 33 of the coupler may be a single piece, onto which the mount 22 is welded at the inboard end, then the coupler 10 is machined, as required to shape, after welding, for example to provide the slots 25, 32. This single piece may then be bolted to the subsea module and thereafter the inboard connector part 12 is rigidly fixed to the coupler, In a first example arrangement, three single phase couplers 10 are mounted to the transformer 3 with a longitudinal axis 11 of each coupler being at an angle with respect to the horizontal, typically of up to 45°. In each coupler 10 is mounted a first connector part 12 (see also FIG. 4) at the inboard end 30 of the coupler, with respect to the transformer. That first connector part 12 may be a plug connector or receptacle connector. Subsea grids are typically mounted in a frame above the seabed, so that cables connected to subsea modules drop down toward the seabed. Setting the couplers at an angle to the horizontal, reduces the bend in the cables as they drop toward the seabed and reduces the force that the ROV needs to move against friction of the cables on the seabed, or to a lesser extent in the coupler, to make the connection when the ROV brings the moveable outboard second connector part 14 into contact with the inboard connector part 12. The outboard connector part may be a receptacle connector or plug connector to correspond with the plug connector or receptacle connector at the inboard end.

In a second example arrangement, seen to the left of FIGS. 2*a* and 2*b*, a series of three couplers 10*a*, 10*b*, 10*c* are mounted in steps, one beside the next, with the outermost coupler 10*a* from the transformer 3 being at the lowest point and the innermost coupler 10*c* being at the highest point of the steps. In this example, each coupler is substantially horizontal. Bend restrictors may be applied to the cables at the outboard end of the couplers to prevent excessive bend being introduced in cables that drop down to the seabed, as described above. Cables 15*a*, 15*b*, 15*c* couple the first connector part 12 to the transformer 3. In a third example arrangement, all three couplers are mounted at the same vertical level relative to the transformer 3 and are substantially horizontal. Cables 16 at the inboard end of each coupler couple the first connector part 12 in each coupler to the transformer 3. In one coupler 10, the second connector part 14 and its cable 13 can be seen. Again, bend restrictors may be used for the outboard cable.

Figure 3:
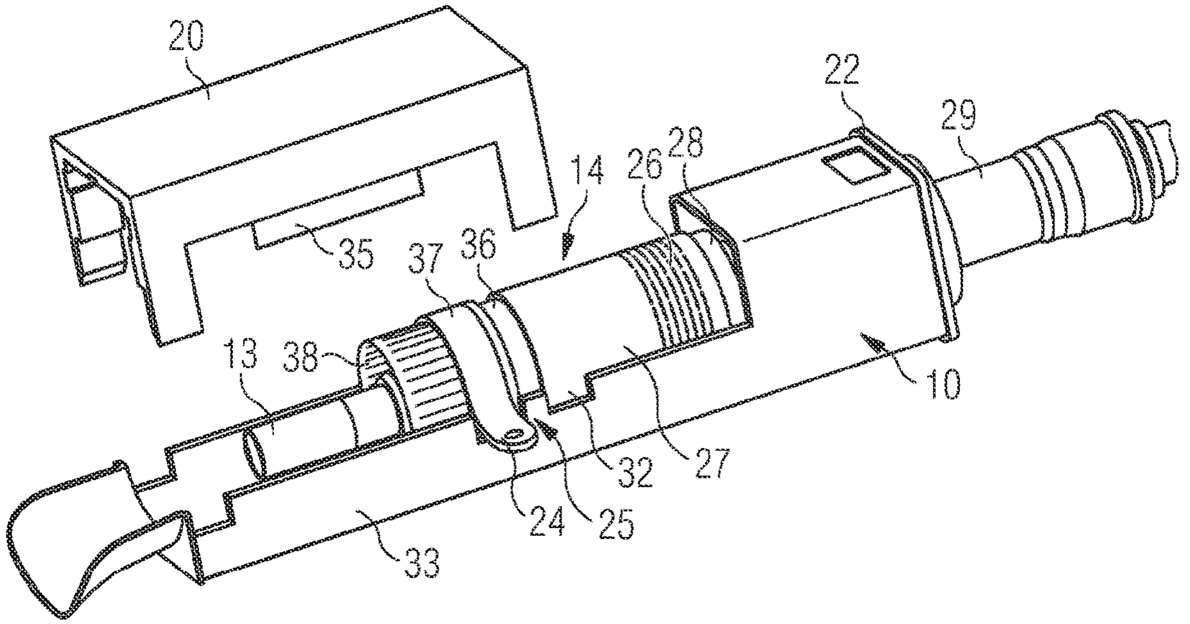
FIG. 3 illustrates more detail of a single phase coupler according to the present invention.

FIG. 3 shows more detail of the coupler and connector and ROV tool. The inboard end 30 of the coupler 10 holds the first connector part 12 firmly in place in the rigid mount 22 to allow the second connector part 14 to be mated to the first. The second electrical connector part 14 is provided with an external sleeve 27, mounted radially outward of and in contact with at least part of the length of the connector body of the connector part 14. The sleeve is made from a suitable material, such as a plastic or thermoplastic, which may be for example a synthetic polyamide, such as Nylon, or a metal, such as sea water resistant steel. In either case, the material is typically machined to the required dimensions from a tube or piece. For manufacturing in large quantities, a mould may be created and the shape moulded in metal or thermoplastic, then finished by machining, but for relatively small numbers this is not cost effective.

The external sleeve 27 may be provided with a rotatable cylindrical section 37 in a recess 36 in the sleeve, the section 37 being able to rotate freely about the sleeve recess 36 and being provided with a lifting point 24 to enable an ROV lifting tool (not shown) to lift up the connector. The lifting interface, or tab, 24 allows the ROV to lift the second wet mate connector part 14 comprising the complete mating head, as well as the cable behind the head. The ROV lifting tool may be a simple tool, such as a hook. The lifting point may comprise an eye or other suitable shape formed in the second locating element, or tab 24, on the sleeve 27, to make it easy for the ROV to connect and lift the combination. The connector body 38 in the outboard connector part 14 may be formed as a single piece, with the outer sleeve 27 shrunk or pressed onto it. Part of the outer sleeve 27 may incorporate an integral spring section 26 to pre-load the connector. A connector section 34 connects to the inboard connector part 12 when mated. The sleeve 27 may be attached to this section 34 by a split ring 28. Another part of the sleeve 27 may comprise the recess 36 in which the rotatable section 37 is mounted. The integral preload spring element 26 of the sleeve of the second connector part 14 absorbs force applied by the stroking tool 20 as electrical contact is made between the first and second connector parts. Fine alignment of the electrical connection is made inside the connectors. Optionally, the connector part 14 may have internal buoyancy added to help the ROV with handling the connector and cables underwater. A machined metal split ring 28 may be provided to locate the sleeve on the connector body, fixing the outer sleeve in place longitudinally on the connector part 14.

The coupler housing itself may be made from a simple metal profile, typically a carbon steel beam, cut to a suitable shape for the cradle section 21 at the outboard end and keeping the standard profile at the inboard end 30. The standard profile beam comprises at least one rectilinear side or surface and typically, the standard profile beam comprises no more than four sides. Suitable shapes of cross section include a triangular, rectangular or square cross section. These shapes are relatively inexpensive to manufacture, having few sides and provide stability, with at least one flat side remaining, even after the outboard end of the cradle has been cut, or machined, to shape, which helps with successfully aligning the connector when it is being connected subsea. If necessary, anodes may be fitted to the housing to prevent corrosion.

Figure 5:
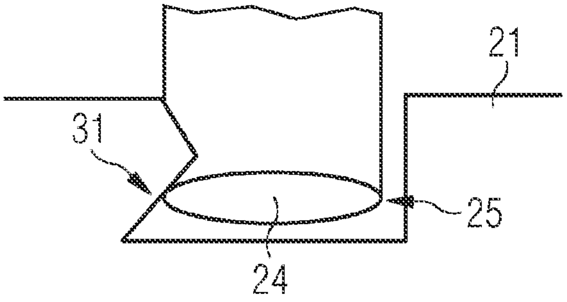
FIG. 5 shows more detail of part of FIG. 3.

A location slot 25 or slots may be provided in the cradle 21. A non-square inwardly facing back edge slope 31, at the end of the slot 25 remote from the subsea module 3, prevents the sleeve tab 24 of the second connector part from working its way out of the slot accidently, as illustrated in FIG. 5. An additional locking device may be added to stop the connector coming out, for instance making use of slots 32 for this, in the cradle. Although, the inboard end 30 of the coupler housing 10 is shown as a box section, this does not have to be and an extension of the cradle section 21 could be used to support the inboard connector part 12, with the rigid mount frame 22 attached, for example, by welding, at the innermost end.

As indicated in the examples of FIGS. 2*a* and 2*b*, the coupler may be mounted horizontally, or at a slight slope downwards towards the seabed, but typically at no more than 45° to the horizontal. The connector part at the inboard end 30 of the coupler 10 (with respect to the subsea module) is fixedly mounted to the rigid mount 22. The coupler is bolted through holes 39 to the subsea module without having any strict tolerance requirements. The second connector part is initially dropped by the ROV down into the cradle 21, then the lifting attachment is detached from the ROV lifting tool. An ROV stroking tool 20, comprising a body, or frame and a slidable carriage mounted to the body or frame, is attached to the outboard connector part 14 whilst it sits in the cradle 21. Then the cylindrical section 37 in the sleeve 27 is rotated in the recess 36, so that the tab 24 rests on the edge of the cradle 21, but is not engaged in the slot 25. Only after a second step, of stroking the connector part 14 along the cradle with the stroking tool, to make contact with the connector part 12 does the tab 24 get moved into the locator slot, which can be seen in more detail in FIG. 5. This provides a good visual indication of whether, or not, the connection has been made. The integral spring section 26 provides flexibility as required for fine alignment between outboard connector 14 and inboard connector 12. The ROV tool 20 may be about 1 m long, and weigh about 100 Kg, but this is within the capability of the ROV to handle. The fluid inlet port 23 provides an attachment by means of which the ROV hydraulic tubing is connected to the tool 20 to operate the sliding carriage 35.

The example has been given with respect to a three phase transformer, but sets of three couplers may be mounted to any subsea module that needs to provide or receive three phase power.

Figure 4:
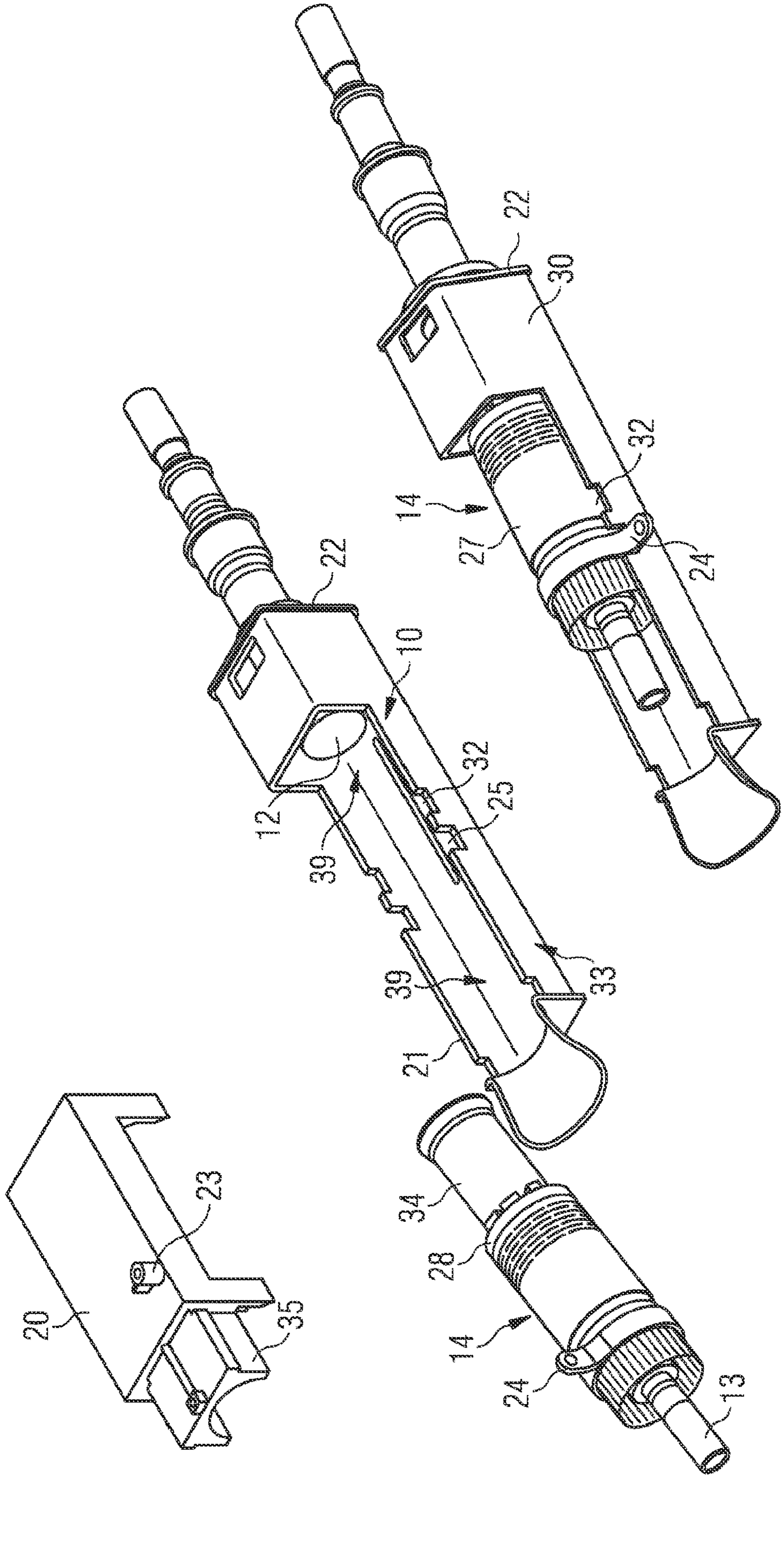
FIG. 4 illustrates stages in a process of connecting an example of a subsea single phase coupler according to the present invention.

The steps involved in connecting the inboard and outboard connectors 12, 14 can be better understood from FIG. 4. The ROV stroking tool 20 picks up the outboard connector 14 and moves the outboard connector and its cable into place in the open cradle section 21 of the coupler 10. The inboard connector 12 is fixedly mounted in a rigid mount 22. In the example shown, the outboard connector 14 is a receptacle part and the inboard connector 12 is a plug part. The ROV tool 20 may be hydraulically powered by connecting a hydraulic line to an inlet port 23. The body of connector 14 is held in the slidable carriage 35 of the ROV tool and once located in place on the cradle 21, the slidable carriage 35 slides the receptacle part 14 along the cradle 21 until the receptacle part is connected with the plug part 12 in its rigid mount. The plug part is fixed in place in the rigid mount 22, but the integral spring section 26 allows for minor misalignment at the initial point of contact between the plug and receptacle without damage being caused to either part. Thus, the initial connection step is to gently drop the outboard connector 14 into the cradle 21 and the next connection step is to stroke the outboard connector into full connection with the inboard connector 12 using the slidable carriage 35 of the ROV tool 20. Thereafter, the tab 24 is moved into the locator slot 25 to lock the outboard connector 14 in its mated position towards the inboard connector 12.

Figure 6:
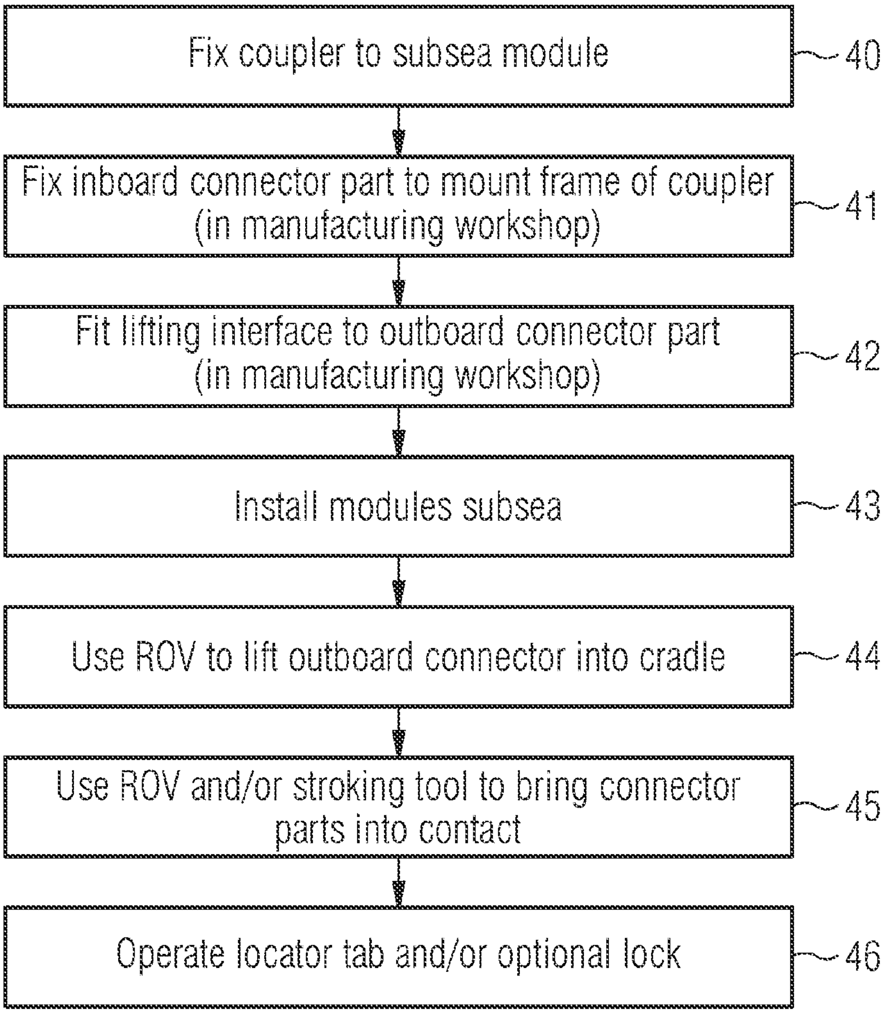
FIG. 6 is a flow diagram of a method of connecting a subsea single phase coupler according to an aspect of the invention; and, FIGS. 7*a*, 7*b*, 8*a*, 8*b*, 9*a*, 9*b*, 10*a* and 10*b* illustrate stages in a process of connecting a further example of a subsea single phase coupler according to the present invention.

One electrical phase is connected at a time, i.e. each phase is connected in an individual operation and three operations have to be carried out to connect all three phases. After the inboard and outboard connectors 12, 14 have been fully connected and the outboard connector locked, the ROV tool 20 can be disconnected and removed A further locking device may be applied if required, but the slot is designed to provide adequate locking by means of an angled surface 31 at the outboard end of the slot, forming an overhand, and the integral spring section 26 providing preload on this overhand surface, preventing unlocking The flow diagram of FIG. 6 illustrates in more detail the steps required to connect using the subsea coupler arrangement of the present invention. During manufacturing, for example, in a manufacturing workshop, prior to subsea installation, the coupler 10 is bolted or otherwise fixed 40 in place on the subsea module 3, 6, 7 and the inboard electrical connector part 12 is fixed 41, for example, bolted, to the mount frame 22 of the coupler at the inboard end 30. A lifting interface is fitted 42 to the outboard electrical connector part 14. This may be in the form of a pull-in head with lifting interface.

At the appropriate time, the modules are installed 43 subsea in a subsea operation, typically given the weight and number of components to make up the subsea gird, this operation may be undertaken from a vessel with a crane. Thereafter, the electrical connection of the modules may be carried out using an ROV. The ROV lifts 44 and/or guides the outboard connector part pull-in head into the cradle 21, with its cable extending from it. After installing the connector part 14 in the cradle 21, the ROV, for example using a stroking tool 20, is operated to stroke 45 the connector part 14 towards the connector part 12 to electrically connect the outboard electrical connector 14 with the inboard electrical connector 12. The lift or handling interface 24 is operated 46 to locate the pull-in head or connector body in its connected position by bringing the tab 24 into the locator slot 25. The ROV tool 20 is now removed. If the optional locking mechanism in slots 32 is to be used, this is applied 46.

Figure 7A:
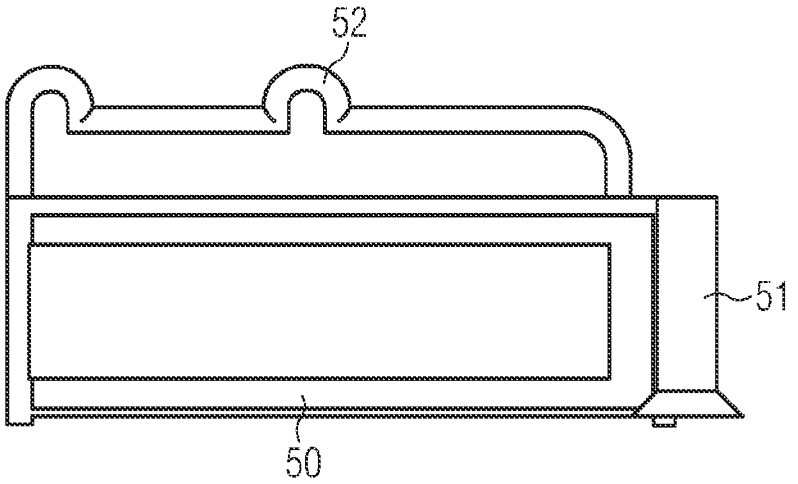
Figure 7B:
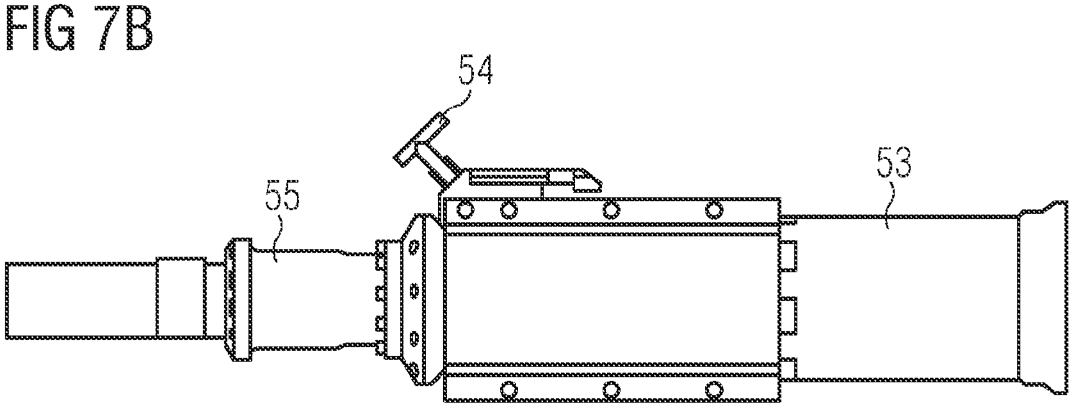
Figure 8A:
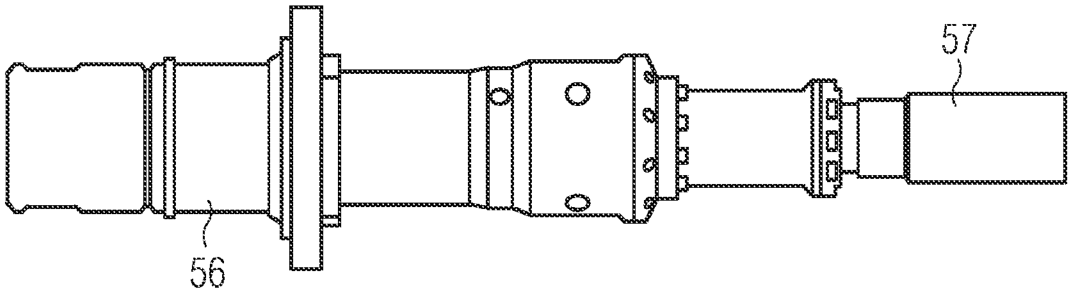
Figure 8B:
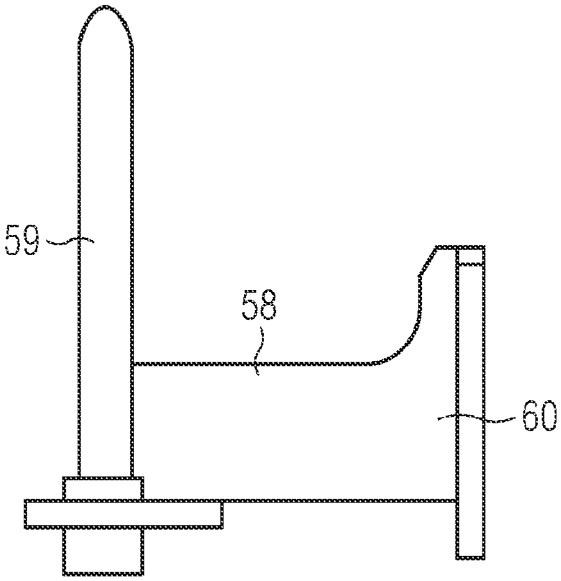

Another example of an embodiment of the present invention is illustrated in FIGS. 7*a* to 10*b*. In this example, instead of the outboard cradle part of the housing being located with the inboard rigid mounting part of the housing before the second wet-mate connector part is brought into position by the ROV, the outboard cradle part of the housing 50 is mounted to the second wet mate connector part 53, 54, 55 in the workshop before subsea installation of modules. The ROV then picks up the outboard connector parts in combination and brings them into contact with the other housing part at the inboard end. FIGS. 7*a* and 7*b* illustrate the separate parts of the outboard end. The cradle 50 comprises guides 51 adapted to fit to corresponding guides 59 on the inboard end and an ROV lifting point 52. The other part of the outboard connection comprises the connector part 53 fitted with an ROV handle 54 and a hose or cable 55 that is terminated to the connector. FIGS. 8*a* and 8*b* illustrates the component parts of the inboard end. These comprise connector part 56 coupled to cable 57 as well as the inboard housing 58 comprising guide pins 59 formed on inboard fixed mount 60.

The outboard frame guides illustrated in this example comprise hollow cylinders 51 at one end of the frame and the inboard guides comprise corresponding cylindrical pins 59, but other arrangements may be used, including changing the cross section of the pins and frame guides, for example, to a square, rectangular or hexagonal cross section.

Figure 9A:
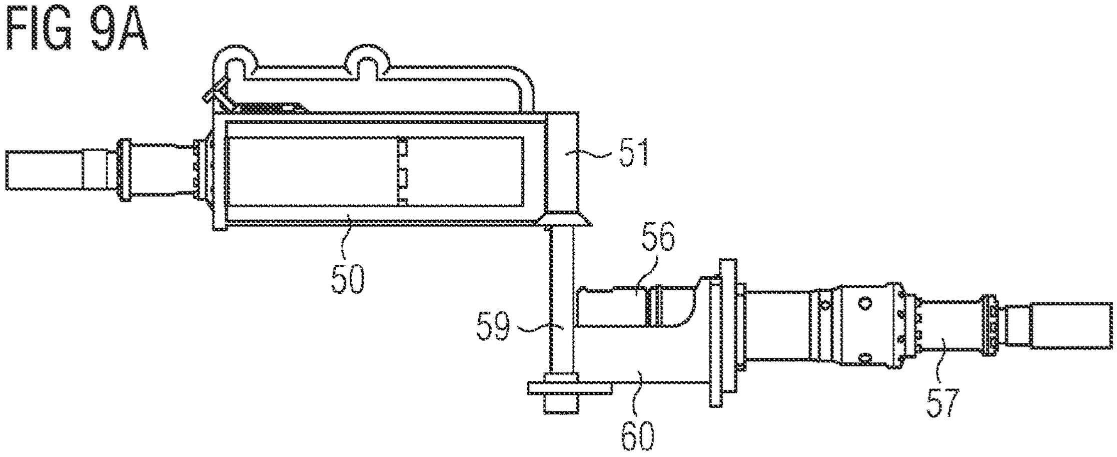
Figure 9B:
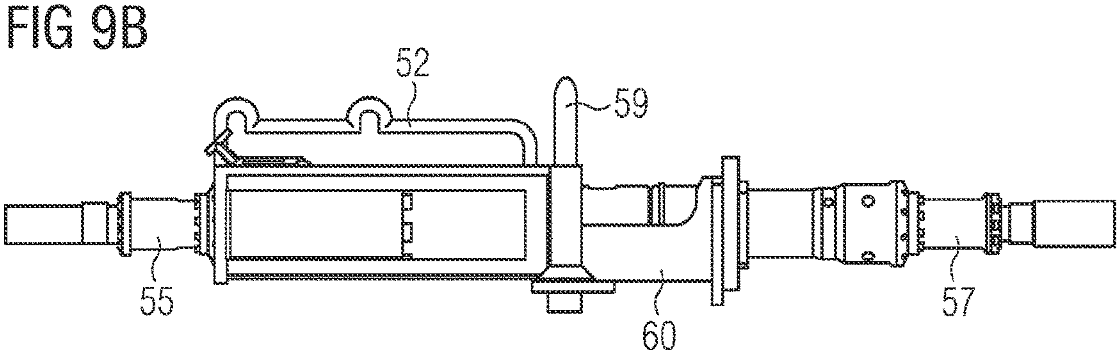

FIGS. 9*a* and 9*b* illustrate how the guide parts 51, 59 cooperate to align the outboard connector part 53 with the inboard connector part 56. The inboard connector and cable 56, 57 are fitted to the fixed mounting 60. The ROV picks up the connector 53 in its frame housing cradle 50 and locates guides 51 over the pins 59. Once located, the ROV then lowers the housing, connector and cable until the cradle 50 meets an end stop on the fixed mounting 60.

Figure 10A:
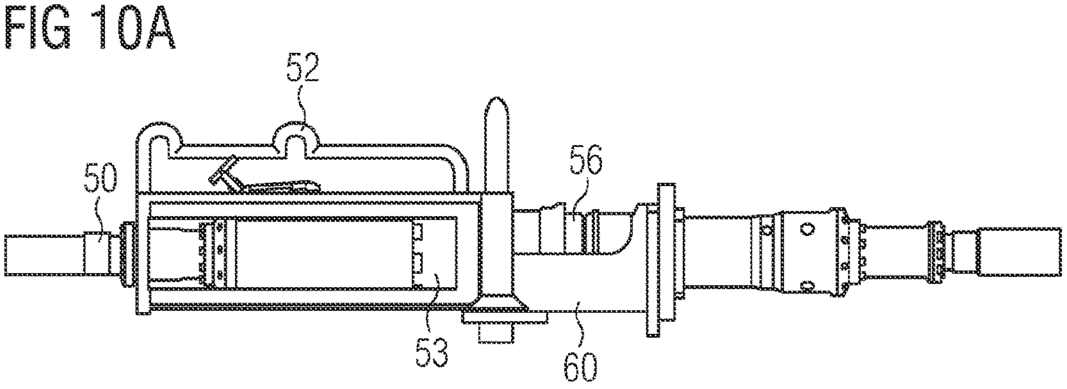
Figure 10B:
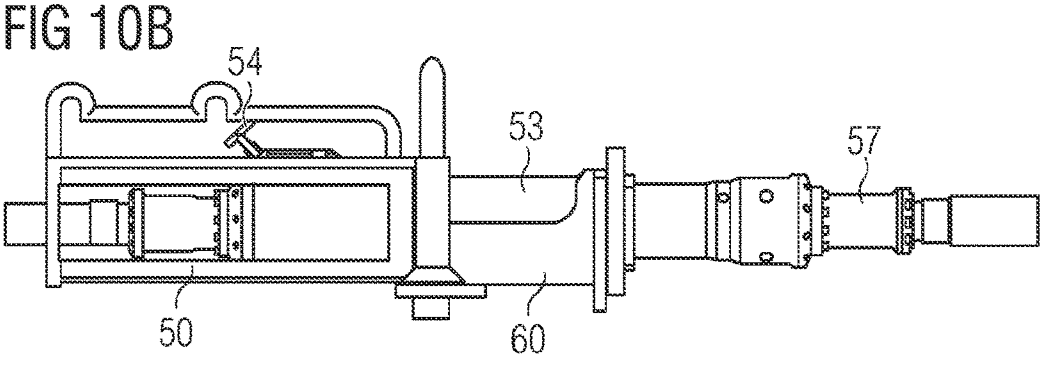

Finally, as shown in FIGS. 10*a* and 10*b*, the ROV handle 54 is engaged by the ROV and is used to slide the outboard connector part 53 fully into electrical contact with the inboard connector part 56.

The method by which the outboard and inboard connector parts are brought together is broadly the same as in the previous example, in that the ROV takes hold of the outboard connector part in its frame housing and manoeuvres that into position coupled to the inboard connector part in its fixed housing. The two housing parts are connected together by locating the openings at the inboard end of the outboard frame part, over the pins at the outboard end of the inboard fixed part. The weight of the connector and frame under the effect of gravity then holds the frame in place with the outboard connector part aligned with the inboard connector part and partially in contact, just touching. The next step is for the ROV to use the ROV handle to complete the connection of the connector parts, whereby the outboard connector part is forced into the inboard connector part. A locator may clip into place during the process to secure the connector parts in their fully connected state, such as a sprung clip, and an optional locking mechanism may be operated by the ROV to prevent inadvertent separation.

Conventionally, subsea mating of single large power couplers using an ROV has not been done because suitable arrangements have not been available. The present invention provides an easily operated method, in which standard materials may be used for the components and the equipment may be manufactured with relaxed tolerances, as compared with a three phase head. The design is modular, so can be adapted to the specific requirements of each operator and is easier to arrange and install or assemble in modules than conventional three phase heads. The cradle may be formed from a simple profile, with a welded plate as a flange and machined to relaxed tolerances, so the work can be done by a non-specialized workshop. The outboard connector part, or pull-in head, may be simply manufactured without needing to use a specialized workshop, as the components have a relatively simple shape and there are not many components required to fit the coupler 10 with the connector parts 12, 14.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the embodiments, the invention is not limited by the examples disclosed, and other variations can be derived therefrom by a person skilled in the art without departing from the scope of the invention.

The invention claimed is:

1. A subsea single phase coupler for a subsea connector, the coupler comprising:

a housing having an inboard end and an outboard end and defining a longitudinal axis extending between the inboard end and the outboard end;

a rigid mount fixedly attached to the inboard end of the housing;

a first wet mate connector fixedly attached to the rigid mount;

a second wet mate connector;

a cradle formed as part of the housing and arranged to receive the second wet mate connector in a first position and to allow for movement of the second wet mate connector along the longitudinal axis from the first position to a second position in which the second wet mate connector is connected to the first wet mate connector;

a first locating element formed as part of the housing and positioned in the cradle; and a second locating element coupled to the second wet mate connector and rotatable about the longitudinal axis into engagement with the first locating element after connection of the first wet mate connector and the second wet mate connector.

2. The coupler according to claim 1, wherein the housing includes at least one rectilinear side or surface.

3. The coupler according to claim 1, wherein the housing includes no more than four sides, and is one of a triangular, rectangular or square cross section.

4. The coupler according to claim 1, wherein the second wet mate connector is removably mounted in the cradle.

5. The coupler according to claim 1, wherein the inboard end and the outboard end of the housing comprise separable parts.

6. The coupler according to claim 5, wherein each of the separable parts comprise guide members adapted to cooperate to align the first wet mate connector and the second wet mate connector when the guide members are in place.

7. The coupler according to claim 5, wherein the cradle of the housing comprises an open frame.

8. The coupler according to claim 1, wherein the second wet mate connector comprises a connector body; a sleeve mounted radially outwardly of and in contact with at least part of a length of the connector body; and, a movable fixing on the connector body to locate the sleeve on the connector body.

9. The coupler according to claim 8, wherein the sleeve comprises a plastic, thermoplastic or metal sleeve.

10. The coupler according to claim 8, wherein the sleeve comprises an integral preload spring element.

11. The coupler according to claim 8, wherein the first locating element comprises a slot in the housing and the second locating element comprises a tab on a section in the sleeve of the second wet mate connector.

12. The coupler according to claim 11, wherein a rear edge of the slot comprises a non-square inwardly facing slope.

13. The coupler according to claim 11, wherein the tab is integral with a rotatable section and provides a lifting point for an ROV lifting tool.

14. The coupler according to claim 1, wherein the cradle further comprises a locking mechanism to lock the second locating element in place after connection of the first wet mate connector and second wet mate connector.

15. The coupler according to claim 1, wherein the coupler is mounted to a subsea module at an angle in a range of zero degrees relative to a horizontal axis of the subsea module to 45 degrees to the horizontal axis of the module.

16. The coupler according to claim 15, wherein the subsea module is one of a transformer, a variable speed drive, a pump, a compressor, or a separator.

17. The coupler according to claim 1, wherein the second wet mate connector connects a jumper, umbilical or subsea cable, or provides a protective cap for the first wet mate connector.

18. The coupler according to claim 1, wherein one of the first wet mate connector and the second wet mate connector comprises a plug connector and the other comprises a receptacle connector.

19. A method of coupling a first wet mate connector and a second wet mate connector of a subsea module, including a subsea single phase coupler according to claim 1; the method comprising:

placing the second wet mate connector into the cradle using a stroking tool and/or manipulator arm/grip of a remotely operated vehicle (ROV);

activating a sliding carriage of the stroking tool and/or manipulator arm/grip to move the second wet mate connector towards the first wet mate connector and join the first wet mate connector and the second wet mate connector.

20. The method according to claim 19, further comprising:

engaging a first locating element with a second locating element and removing the stroking tool and/or manipulator arm/grip.

21. The method according to claim 20, wherein the engaging comprises rotating a tab on a sleeve of the second wet mate connector into a locator slot of the cradle.

22. The method according to claim 19, wherein an integral preload spring element of a sleeve of the second wet mate connector absorbs force applied by the stroking tool as electrical contact is made between the first wet mate connector and the second wet mate connector.

23. The method according to claim 19, wherein the subsea module comprises one of a subsea transformer, a subsea compressor, a subsea variable speed drive, or a subsea separator.

24. The method according to claim 19, wherein the activation of the sliding carriage of an ROV tool includes applying hydraulic pressure to the stroking tool through a hydraulic fluid port.

* * * * *